(12) United States Patent
Hsu

(10) Patent No.: US 11,210,639 B2
(45) Date of Patent: Dec. 28, 2021

(54) ELECTRONIC DYNAMIC CALENDAR SYSTEM, OPERATION METHOD AND COMPUTER READABLE STORAGE MEDIUM

(71) Applicant: Kevin Ta Hsiang Hsu, New Taipei (TW)

(72) Inventor: Kevin Ta Hsiang Hsu, New Taipei (TW)

(73) Assignee: Kevin Ta Hsiang Hsu, New Taipei (TW)

(*) Notice: Subject to any disclaimer, the term of this patent is extended or adjusted under 35 U.S.C. 154(b) by 0 days.

(21) Appl. No.: 16/827,921

(22) Filed: Mar. 24, 2020

(65) Prior Publication Data

US 2021/0192463 A1  Jun. 24, 2021

(30) Foreign Application Priority Data

Dec. 24, 2019 (TW) .................. 108147410

(51) Int. Cl.
  *G06F 3/0481* (2013.01)
  *G06Q 10/10* (2012.01)
  *G06F 16/906* (2019.01)
  *G06F 3/14* (2006.01)

(52) U.S. Cl.
  CPC ....... *G06Q 10/1093* (2013.01); *G06F 3/0481* (2013.01); *G06F 3/14* (2013.01); *G06F 16/906* (2019.01)

(58) Field of Classification Search
  CPC .... G06Q 10/1093; G06F 3/0481; G06F 3/048
  See application file for complete search history.

(56) References Cited

U.S. PATENT DOCUMENTS

| | | | |
|---|---|---|---|
| 2010/0070877 A1* | 3/2010 | Scott .................... | G06Q 10/109 715/751 |
| 2010/0088143 A1* | 4/2010 | Platt ..................... | G06Q 10/109 705/7.18 |
| 2012/0143961 A1* | 6/2012 | Jonsson ............. | G06Q 10/1093 709/206 |
| 2012/0259927 A1* | 10/2012 | Lockhart ................. | H04L 51/10 709/206 |
| 2016/0148162 A1* | 5/2016 | Du ..................... | G06Q 10/1093 705/7.18 |
| 2018/0012195 A1* | 1/2018 | Nagaraj ............. | G06Q 10/1095 |
| 2019/0244178 A1* | 8/2019 | Carter ................ | G06Q 10/1095 |

* cited by examiner

*Primary Examiner* — Jeanette J Parker
(74) *Attorney, Agent, or Firm* — Amin, Turocy & Watson, LLP

(57) ABSTRACT

Provided is an electronic dynamic calendar system, an electronic dynamic calendar operation method and a computer readable storage medium for providing an electronic calendar capable of importing multimedia messages such as audio, photos and video. Different from conventional electronic calendars that can only record text messages therein, the electronic calendar can have richer content. In addition to a text message, a multimedia message can be set as a reminder according to the user's need such that the reminder content set by the user can be more clearly understood and expressed.

18 Claims, 10 Drawing Sheets

ELECTRONIC DYNAMIC CALENDAR SYSTEM, OPERATION METHOD AND COMPUTER READABLE STORAGE MEDIUM

CROSS REFERENCE TO RELATED APPLICATIONS

This application claims priority to Taiwan Application Serial No. 108147410, filed on Dec. 24, 2019. The entirety of the application is hereby incorporated by reference herein and made a part of this specification.

BACKGROUND

1. Technical Field

The present disclosure relates to electronic calendar technologies, and more particularly, to an electronic dynamic calendar system, an electronic dynamic calendar operation method and a computer readable storage medium.

2. Description of Related Art

Calendars are indispensable for busy modern people, especially important for businessmen. Using a calendar effectively can help a businessman to work more efficiently. Generally, a conventional electronic calendar can only store text messages and set reminder times and/or dates. However, when a user uses a text message as a reminder, the user usually can only set simple content such as "remember to buy food after work," "take the family to see a doctor," or "remember to bring a product to the meeting." Although it is convenient to use a simple text message as a reminder, the amount of information is quite limited, which may cause the user to misunderstand or be unclear about the content.

For example, the above-described text message of "remember to bring a product to the meeting" does not include product information and may confuse the user. Although the conventional electronic calendar can add the name or specification of the product to the content of the reminder, it complicates the text message. As such, it becomes difficult for the user to effectively understand the content of the text message. In a word, when a text message is used as a reminder, the more the content, the clearer but more complicated the message becomes. On the contrary, the less the content, the more unclear but simpler the message becomes.

In order to overcome the above-described drawbacks, the present disclosure provides an electronic dynamic calendar containing multimedia messages such as audio, photos and/or videos, wherein the multimedia messages can be used independently or in combination with text messages so as to facilitate the user to more intuitively understand the meaning of the reminder content. Further, the content becomes more concise and the user efficiency is improved.

SUMMARY

In view of the above-described drawbacks, the present disclosure provides an electronic dynamic calendar system, which comprises: a display having a screen; a data transmission interface for receiving a multimedia message; and a processing unit, comprising: a calendar database for providing an electronic calendar having a plurality of fields, wherein each of the fields is used for accessing record information; a classification module for classifying the multimedia message received by the data transmission interface into the record information, wherein the record information is at least one object or at least one group, the at least one object is the multimedia message and the at least one group has the at least one object; a storage module for storing the record information generated by the classification module into any one of the fields of the electronic calendar; a dynamic state setting module for setting a dynamic state of the field of the electronic calendar having the record information stored therein so as to cause the electronic calendar to become an electronic dynamic calendar, wherein the dynamic state of the field is a thumbnail or text; and a display module for outputting the electronic dynamic calendar to the screen of the display, thereby displaying the dynamic state of the field of the electronic dynamic calendar on the screen of the display.

The present disclosure further provides an electronic dynamic calendar operation method, which comprises the steps of: a calendar database providing an electronic calendar having a plurality of fields, wherein each of the fields is used for accessing record information; a classification module classifying a multimedia message received by a data transmission interface into the record information, wherein the record information is at least one object or at least one group, the at least one object is the multimedia message and the at least one group has the at least one object; a storage module storing the record information generated by the classification module into any one of the fields of the electronic calendar; a dynamic state setting module setting a dynamic state of the field of the electronic calendar having the record information stored therein so as to cause the electronic calendar to become an electronic dynamic calendar, wherein the dynamic state of the field is a thumbnail or text; and a display module outputting the electronic dynamic calendar to a screen of a display, thereby displaying the dynamic state of the field of the electronic dynamic calendar on the screen of the display.

In an embodiment, the electronic dynamic calendar opens access to edit the at least one object or the at least one group.

In an embodiment, the classification module further comprises classifying the multimedia message into the record information according to time, date, file format, position or a combination thereof, and the position is an address or is latitude and longitude.

In an embodiment, the classification module is further used to classify a web address into the record information, wherein the record information is the at least one object or the at least one group, the at least one object is the multimedia message or the web address, and the at least one group has the at least one object.

In an embodiment, according to time, date or a combination of time and date of the record information, the storage module stores the record information in a field of the electronic calendar having the same time, date or a combination thereof.

In an embodiment, the display module further allows to move the dynamic state of the field of the electronic dynamic calendar displayed on the screen of the display to any one of the fields of the electronic dynamic calendar displayed on the screen.

In an embodiment, after the dynamic state of the field on the screen of the display is clicked, the display module displays complete content of the record information corresponding to the clicked dynamic state of the field on the screen of the display.

In an embodiment, a login module is included for creating an electronic dynamic calendar account, logging in to the electronic dynamic calendar system with an existing electronic dynamic calendar account or logging in to the electronic dynamic calendar system with a social account.

In an embodiment, after the login module logins to the electronic dynamic calendar system with the social account, the login module synchronizes the social account such that the multimedia message of the social account is transmitted through the data transmission interface to the classification module for classification and stored by the storage module in any one of the fields of the electronic calendar of the calendar database.

In an embodiment, a search module is included for searching for the record information in any one of the fields of the electronic dynamic calendar or the dynamic state of the field by using a keyword, time, date, file format, position or a combination thereof.

In an embodiment, a reminder module is included for setting the dynamic state of any one of the fields of the electronic dynamic calendar as a reminder according to time, date or a combination thereof.

In an embodiment, a multimedia module is included for obtaining the multimedia message through an audio recording device or a photo or video capturing device of a terminal device so as for the classification module to classify the multimedia message obtained by the multimedia module into the record information.

Further, the present disclosure provides a computer readable storage medium applicable in a computer, which stores instructions for performing the above-described electronic dynamic calendar operation method.

Therefore, the present disclosure provides an electronic calendar capable of importing multimedia messages such as audio, photos and video. Different from the conventional electronic calendars that can only record text messages therein, the electronic dynamic calendar of the present disclosure can contain record information of multimedia messages such as audio, photos and video. The record information can be selected and imported to the electronic dynamic calendar by the user according to the need. In addition, the record information in any one of the fields of the electronic dynamic calendar or the dynamic state of the field can be displayed on the screen of the display.

Further, the electronic dynamic calendar of the present disclosure can open access to edit, thus allowing other people to edit the content of the calendar and set a reminder. When a reminder is due, not just text but image or sound may pop up. For example, a user can set a multimedia message as a reminder of a meeting and share it with other related users. As such, the other related users are reminded of the meeting by the multimedia message such as a product pattern that pops up. Hence, the received message content is more intuitive and effective for the users.

DETAILED DESCRIPTION OF THE EMBODIMENTS

The following illustrative embodiments are provided to illustrate the present disclosure, these and other advantages and effects can be apparent to those in the art after reading this specification.

Figure 1:
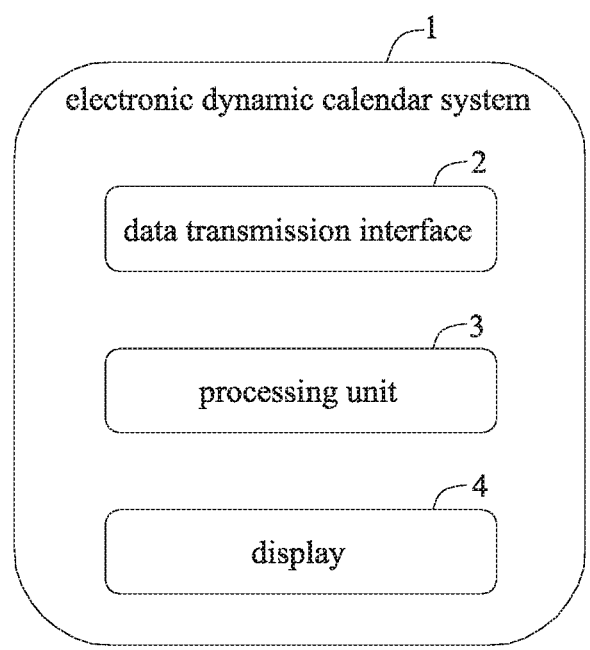
FIG. 1 is a schematic architecture diagram of an electronic dynamic calendar system according to an embodiment of the present disclosure.
Figure 2:
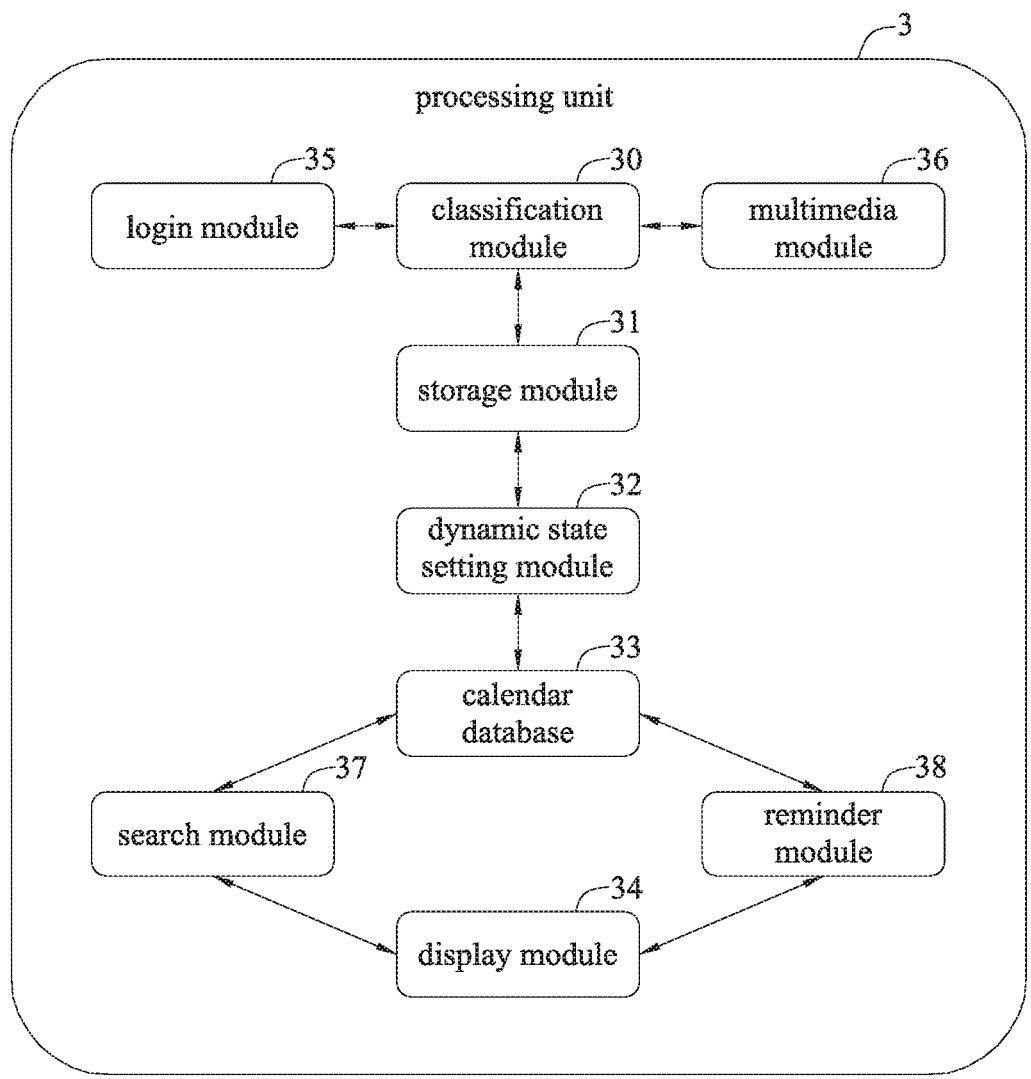
FIG. 2 is a schematic architecture diagram of a processing unit of an electronic dynamic calendar system according to an embodiment of the present disclosure.

FIGS. 1 and 2 are schematic architecture diagrams of an electronic dynamic calendar system according to an embodiment of the present disclosure. As shown in FIGS. 1 and 2, the electronic dynamic calendar system 1 has a data transmission interface 2, a processing unit 3 and a display 4. The processing unit 3 has a classification module 30, a storage module 31, a dynamic state setting module 32, a calendar database 33, a display module 34, a login module 35, a multimedia module 36, a search module 37 and a reminder module 38. In an embodiment, the data transmission interface 2 can be an API, USB, Wi-Fi, Bluetooth, NFC, network (e.g., a mobile network) or any data transmission interface, and the processing unit 3 can be, but not limited to, a unit having a processor, a memory, a storage device, a database, a cloud computing platform or a cloud server.

Figure 3A:
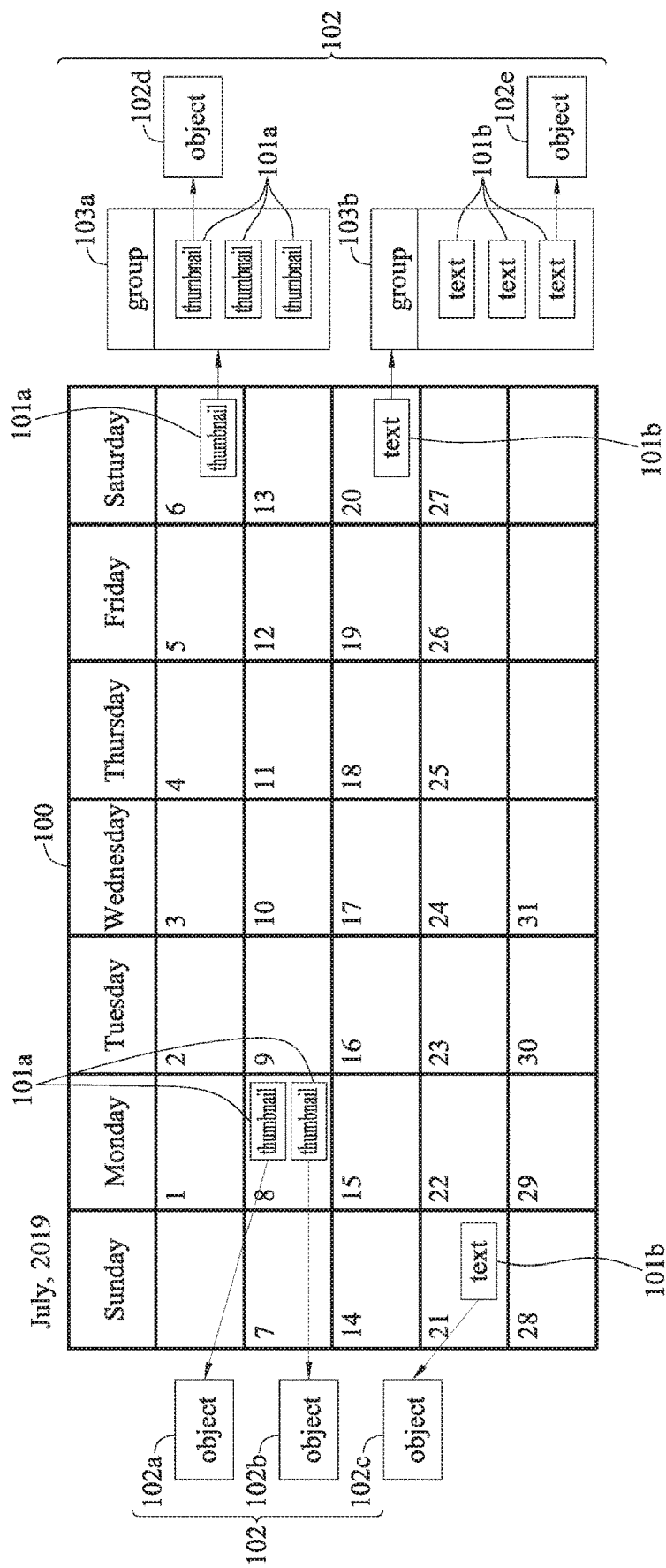
FIGS. 3A and 3B are schematic diagrams of electronic dynamic calendars according to an embodiment of the present disclosure.
Figure 3B:
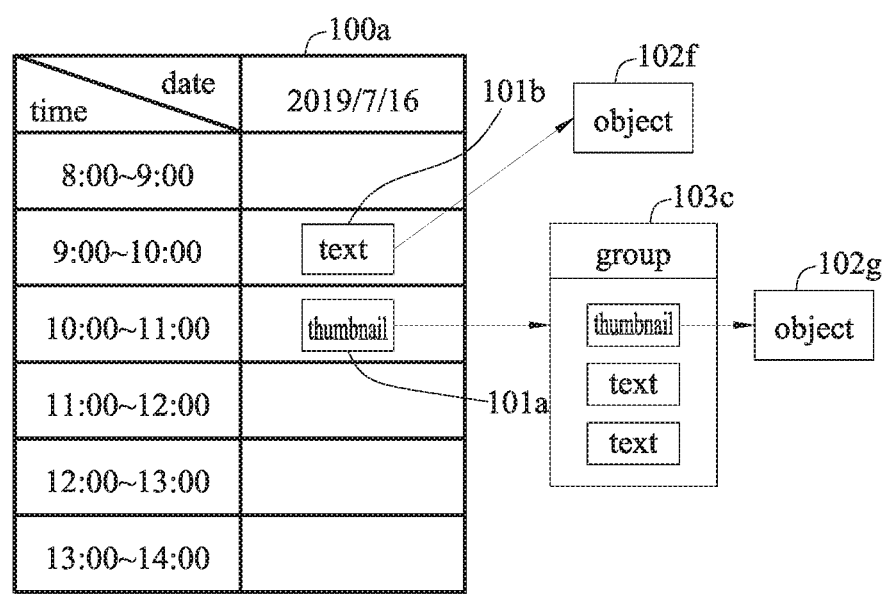

FIGS. 3A and 3B are schematic diagrams of electronic dynamic calendars according to the present disclosure. As shown in FIGS. 3A and 3B, the electronic dynamic calendars 100, 100a have fields with dynamic states. For example, the dynamic state of a field is a thumbnail 101a or text 101b. The dynamic state of the field contains at least a group 103 or at least an object 102.

In particular, when a multimedia message such as audio, photos and/or video is imported to the classification module 30 by a user, it is classified into record information of at least an object 102 or at least a group 103 according to time, date, file format, position or a combination thereof. At least an object 102 is the multimedia message and at least a group 103 has at least an object 102.

In an embodiment, the calendar database 33 provides an electronic calendar having a plurality of fields, and each of the fields is used for accessing record information. The classification module 30 classifies a multimedia message such as audio, photos and/or video received by the data transmission interface 2 into the record information. The record information is at least an object 102 or at least a group 103, at least an object 102 is the multimedia message and at least a group 103 has at least an object 102. The storage module 31 stores at least an object 102 or at least a group 103 to record information in any one of the fields of the electronic calendar. The dynamic state setting module 32 sets a dynamic state of the field of the electronic calendar so as to cause the electronic calendar to become an electronic dynamic calendar 100. The dynamic state of the field is a thumbnail 101*a* or text 101*b*. The display module 34 outputs the electronic dynamic calendar to the screen of the display 4, thereby displaying the dynamic state of the field of the electronic dynamic calendar 100 on the screen of the display 4.

Figure 4:
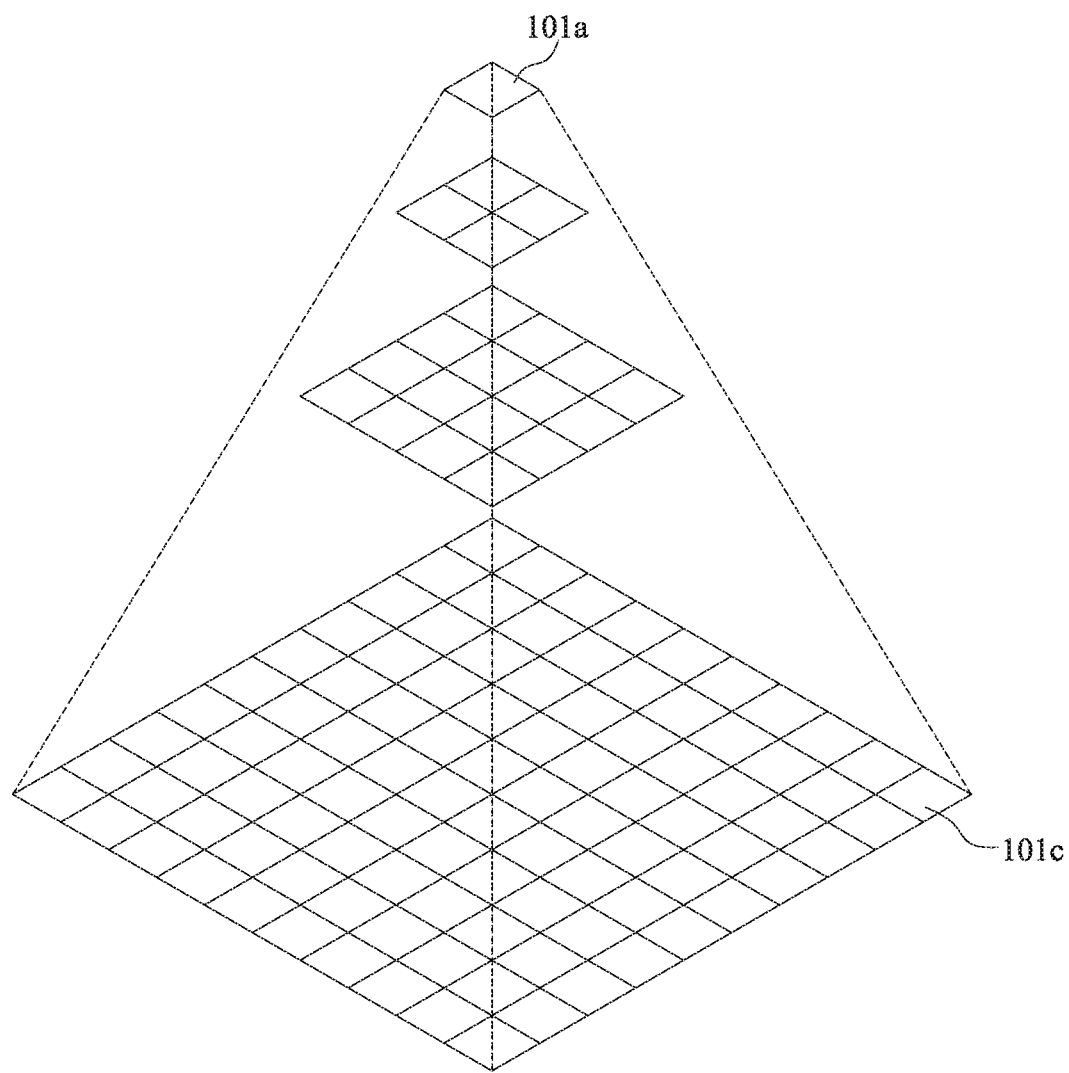
FIG. 4 is a schematic diagram of a thumbnailing method according to the present disclosure.

FIG. 4 is a schematic diagram of a thumbnailing method according to the present disclosure. As shown in FIG. 4, when the dynamic state setting module 32 sets the dynamic state of the field to be the thumbnail 101*a*, redundant pixels in rows and columns of a picture 101*c* formed from a first image of a video or a photo or a combination thereof are removed to form the thumbnail 101*a*. However, directly reducing pixels may lead to a poor quality of the thumbnail 101*a*. Therefore, before thumbnailing, a Gaussian filter is applied to the picture 101*c* to maintain the quality of the picture 101*c*. As such, after the picture 101*c* is scale filtered by the Gaussian filter, pixels in even rows and columns are removed and each time the size of the picture is reduced by ¼. The two processes are repeated until the picture is reduced to the required size.

Further, when the dynamic state setting module 32 sets the dynamic state of the field to be the text 101*b*, the text 101*b* is set by the user through the dynamic state setting module 32.

Furthermore, the electronic dynamic calendar 100 can open access to edit at least an object 102 or at least a group 103.

The classification module 30 can classify the multimedia message such as audio, photos and/or video received by the data transmission interface 2 into at least an object 102 or at least a group 103 according to time, date, file format, position or a combination thereof. The position is an address or is latitude and longitude. The audio format can be MP3, AAC, Ogg Vorbi, Opus, WAV, FLAC, APE, ALAC, Wav-Pack (WV) or the like. The photo format can be GIF, JPEG, PNG, BMP, PDF or the like. The video format can be AVI, MPEG, MP4, RM, RMVB or the like.

According to time, date or a combination of time and date of at least an object 102 or at least a group 103, the storage module 31 stores the record information of at least an object 102 or at least a group 103 in a field of the electronic calendar having the same time, date or a combination thereof.

The display module 34 further allows to manually drag and move the dynamic state of a field of the electronic dynamic calendar 100 displayed on the screen of the display 4 to any one of the fields of the electronic dynamic calendar 100 displayed on the screen.

After the dynamic state of a field on the screen of the display 4 is clicked, the display module 34 further displays complete content of the record information corresponding to the clicked dynamic state of the field on the screen of the display 4.

In an embodiment, the login module 35 is used to create an electronic dynamic calendar account, login to the electronic dynamic calendar system 1 with an existing electronic dynamic calendar account or login to the electronic dynamic calendar system with a social account.

After the login module 35 logins to the electronic dynamic calendar system 1 with the social account, the login module 35 synchronizes the social account such that the multimedia message such as audio, photos and/or video of the social account is transmitted through the data transmission interface 2 to the classification module 30 for classification and stored by the storage module 31 in any one of the fields of the electronic calendar of the calendar database 33.

In an embodiment, the search module 37 is used to search for the record information in any one of the fields of the electronic dynamic calendar 100 or the dynamic state of the field by using a keyword, time, date, file format, position or a combination thereof.

In an embodiment, the reminder module 38 is used to set the dynamic state of any one of the fields of the electronic dynamic calendar 100 as a reminder according to time, date or a combination thereof.

In an embodiment, the multimedia module 36 is used to obtain a multimedia message such as audio, photos and/or video through an audio recording device or a photo or video capturing device so as for the classification module 30 to classify the multimedia message obtained by the multimedia module 36 into the record information.

Figure 5:
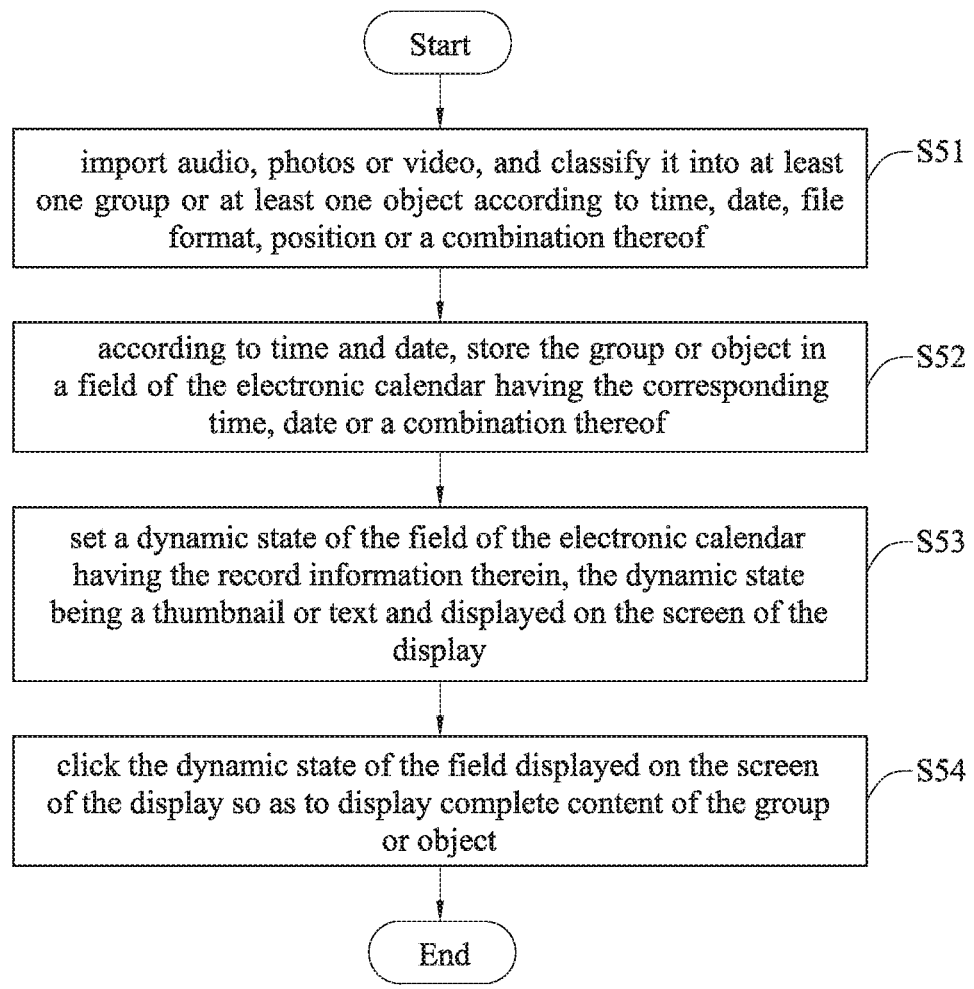
FIG. 5 is a flow diagram illustrating an electronic dynamic calendar operation method according to an embodiment of the present disclosure.

FIG. 5 is a flow diagram illustrating an operation method of the electronic dynamic calendar 100 according to an embodiment of the present disclosure.

Referring to FIG. 5 and FIGS. 1 and 2, the operation method of the electronic dynamic calendar 100 comprises: a calendar database 33 providing an electronic calendar having a plurality of fields, wherein each of the fields is used for accessing record information; a classification module 30 classifying a multimedia message such as audio, photos and/or videos received by a data transmission interface 2 into the record information, wherein the record information is at least an object 102 or at least a group 103, the at least an object 102 is the multimedia message and the at least a group 103 has the at least an object 102; a storage module 31 storing the record information generated by the classification module 30 into any one of the fields of the electronic calendar; a dynamic state setting module 32 setting a dynamic state of the field of the electronic calendar having the record information stored therein so as to cause the electronic calendar to become an electronic dynamic calendar 100, wherein the dynamic state of the field is a thumbnail 101*a* or text 101*b*; and a display module 34 outputting the electronic dynamic calendar 100 to a screen of a display 4, thereby displaying the dynamic state of the field of the electronic dynamic calendar 100 on the screen of the display 4.

For example, the electronic calendar method shown in FIG. 5 comprises the following steps S51 to S54.

At step S51 of FIG. 5, the user imports a multimedia message such as audio, photos and/or video, which is classified into record information (i.e., at least a group 103 or at least an object 102) according to time, date, file format, position or a combination thereof. The position is an address or is latitude and longitude. The audio format can be MP3, AAC, Ogg Vorbi, Opus, WAV, FLAC, APE, ALAC, Wav-Pack (WV) or the like. The photo format can be GIF, JPEG, PNG, BMP, PDF or the like. The video format can be AVI, MPEG, MP4, RM, RMVB or the like.

At step S52 of FIG. 5, according to time, date or a combination of time and date of at least a group 103 or at least an object 102 classified by the classification module 30, the storage module 31 stores at least a group 103 or at least an object 102 in a field of the electronic calendar having the corresponding time, date or a combination thereof.

At step S53 of FIG. 5, the dynamic state setting module 32 sets a dynamic state of the field of the electronic calendar having the record information (i.e., at least an object 102 or at least a group 103) stored therein so as to cause the electronic calendar to become an electronic dynamic calendar 100. The dynamic state of the field is a thumbnail 101*a* or text 101*b* and is displayed on the screen of the display 4.

At step S54 of FIG. 5, the user clicks the dynamic state of the field displayed on the screen of the display 4 and thus complete content of at least a group 103 or at least an object 102 is displayed on the screen of the display 4.

Figure 6:
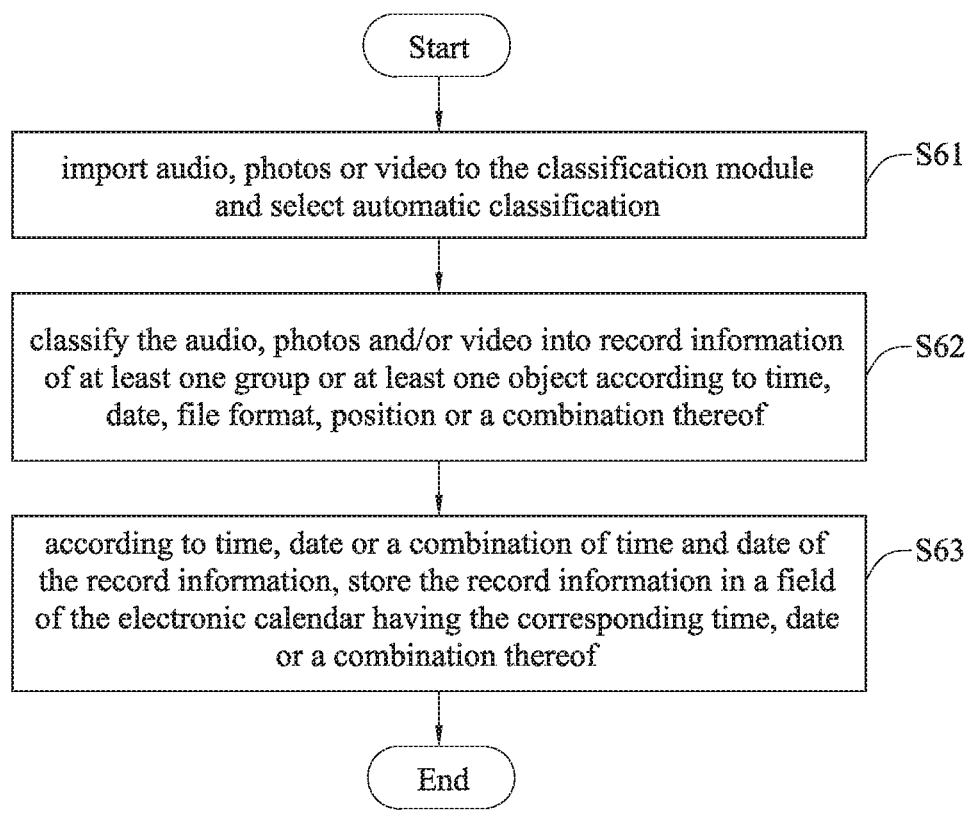
FIG. 6 is a flow diagram illustrating automatic classification of a classification module according to an embodiment of the present disclosure.

FIG. 6 is a flow diagram illustrating a method of automatic classification performed by the classification module 30 according to the present disclosure. The method of automatic classification comprises the following steps S61 to S63.

At step S61 of FIG. 6, the user imports a multimedia message such as audio, photos and/or video to the classification module 30 and selects automatic classification.

At step S62 of FIG. 6, the classification module 30 classifies the multimedia message such as audio, photos and/or video into record information of at least a group 103 or at least an object 102 according to time, date, file format, position or a combination thereof.

At step S63 of FIG. 6, according to time, date or a combination of time and date of the record information of at least a group 103 or at least an object 102, the storage module 31 stores the record information in a field of the electronic calendar having the corresponding time, date or a combination thereof.

Figure 7:
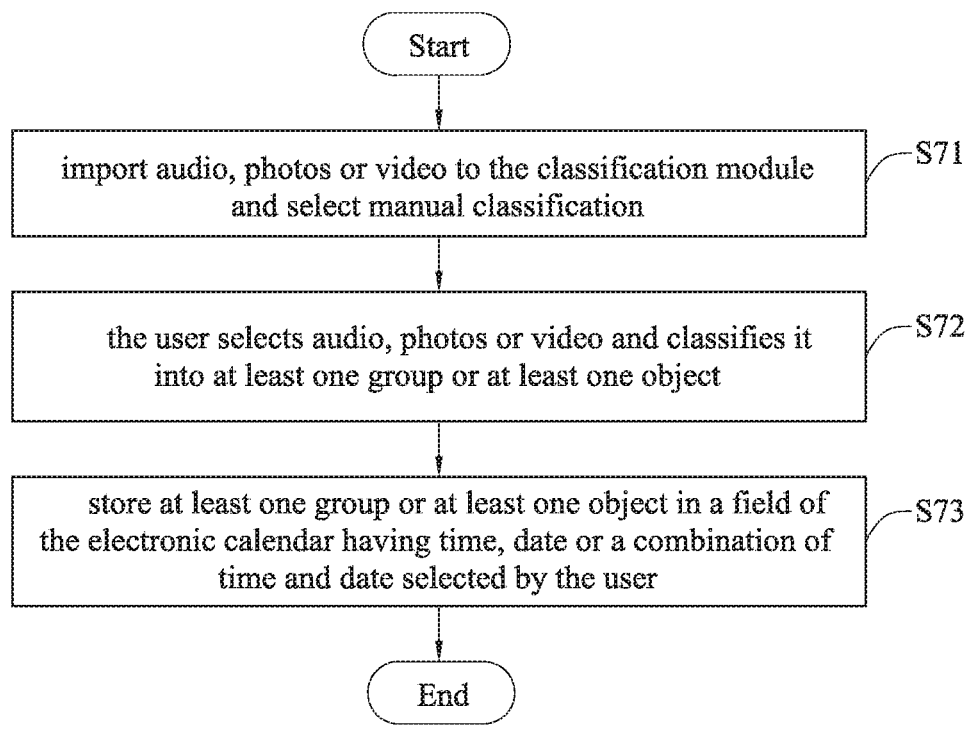
FIG. 7 is a flow diagram illustrating manual classification of a classification module according to an embodiment of the present disclosure.

FIG. 7 is a flow diagram illustrating a method of manual classification performed by the classification module 30 according to the present disclosure. The method of manual classification comprises the following steps S71 to S73.

At step S71 of FIG. 7, the user imports a multimedia message such as audio, photos and/or video to the classification module 30 and selects manual classification.

At step S72 of FIG. 7, the user selects a multimedia message such as audio, photos and/or video in the classification module 30 and classifies the multimedia message into at least a group 103 or at least an object 102.

At step S73 of FIG. 7, in the storage module 31, the user stores the record information of at least a group 103 or at least an object 102 in a field of the electronic calendar having time, date or a combination of time and date selected by the user.

Figure 8:
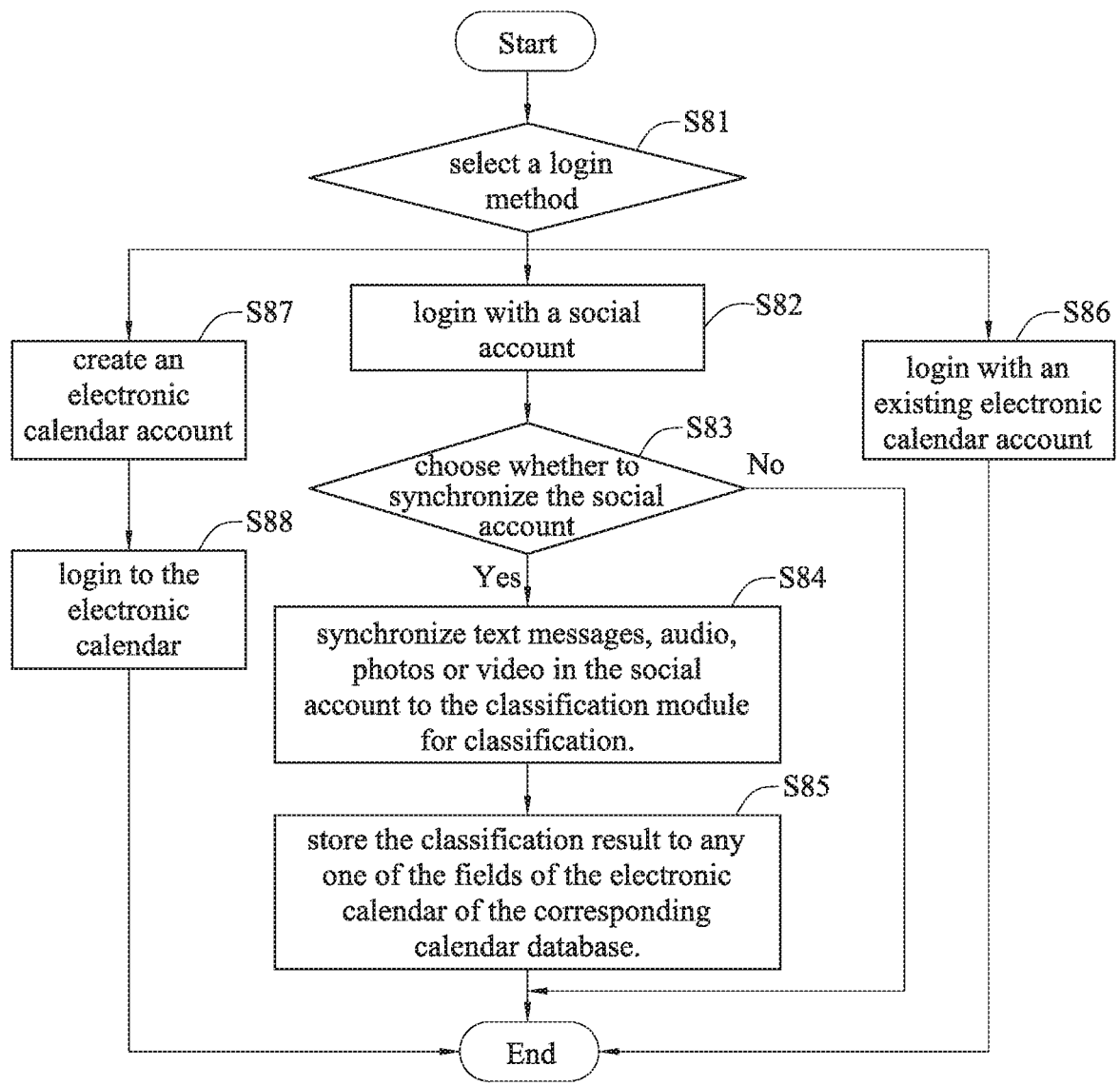
FIG. 8 is a flow diagram illustrating a login method of a login module according to an embodiment of the present disclosure.

FIG. 8 is a flow diagram illustrating a login method performed by the login module 35 according to the present disclosure. The login method comprises the following steps S81 to S88.

At step S81 of FIG. 8, the user selects a login method in the login module 35 so as to create an electronic calendar account, login to the electronic calendar system with an existing electronic calendar account or login to the electronic calendar system with a social account.

At step S82 of FIG. 8, the user chooses to login to the electronic calendar system with the social account.

At step S83 of FIG. 8, the user chooses whether to synchronize the content of the social account to the electronic calendar.

At step S84 of FIG. 8, the user chooses the content of the social account and transmits text messages, audio, photos or video in the social account to the classification module 30 for classification.

At step S85 of FIG. 8, the classification module 30 stores the classification result to any one of the fields of the electronic calendar of the corresponding calendar database 33.

At step S86 of FIG. 8, the user chooses to login to the electronic dynamic calendar system 1 with the existing electronic dynamic calendar account.

At step S87 of FIG. 8, the user chooses to create an electronic dynamic calendar account.

At step S88 of FIG. 8, the user chooses to login to the electronic dynamic calendar system 1 with the created electronic dynamic calendar account.

Figure 9:
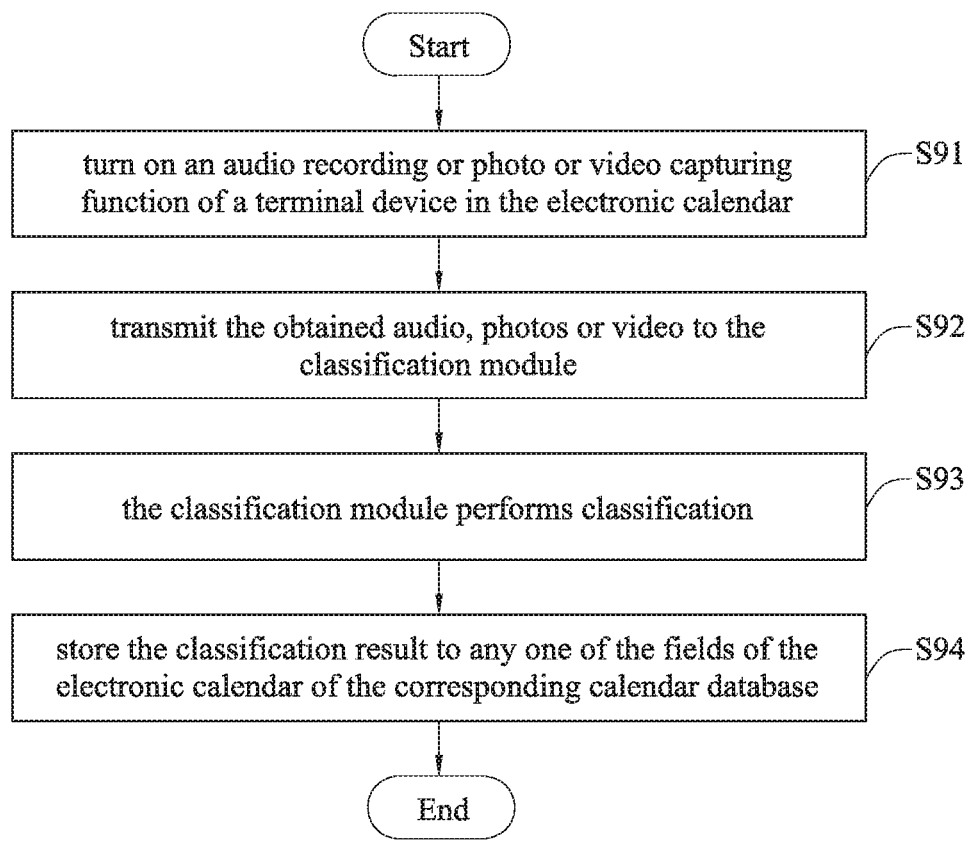
FIG. 9 is a flow diagram illustrating a multimedia importing method of a multimedia module according to an embodiment of the present disclosure.

FIG. 9 is a flow diagram illustrating a multimedia importing method performed by the multimedia module 36 according to the present disclosure. The importing method comprises the following steps S91 to S94.

At step S91 of FIG. 9, the user turns on an audio recording or photo or video capturing function through the multimedia module 36 in the electronic dynamic calendar system 1.

At step S92 of FIG. 9, a multimedia message such as audio, photos and/or video obtained by the multimedia module 36 through the audio recording or photo or video capturing function is transmitted to the classification module 30.

At step S93 of FIG. 9, the classification module 30 classifies the multimedia message such as audio, photos and/or video.

At step S94 of FIG. 9, the classification module 30 stores the classification result to any one of the fields of the electronic calendar of the corresponding calendar database 33.

The present disclosure further provides a computer readable storage medium applicable in a computer or computing device having a processor and/or memory. The computer readable storage medium stores instructions, which are executed by the computer or computing device through the processor (e.g., CPU, GPU, etc.) and/or memory so as to perform the above-described electronic dynamic calendar operation method.

Therefore, the electronic dynamic calendar system, the electronic dynamic calendar operation method and the computer readable storage medium according to the present disclosure have the following features, advantages or technical effects.

1. In addition to text messages, the electronic dynamic calendar of the present disclosure can record audio, photos or video in a field of the electronic calendar having the corresponding time, date or a combination thereof, thus making it easier for the user to record events.

2. The electronic dynamic calendar of the present disclosure provides various methods for importing audio, photos or video, including audio, photos or video already stored in terminal devices such as mobile phones, tablets and personal computers or social software or recorded or captured audio, photos or video, thus making it more convenient for the user to import audio, photos or video.

3. The electronic dynamic calendar of the present disclosure allows audio, photos or video to be automatically classified or manually classified by the user according to the user's preference, so it is more convenient for classification.

4. The electronic dynamic calendar of the present disclosure can set the dynamic state of a field of at least an object containing audio, photos or video or at least a group having the object as a reminder. When the reminder pops up on the screen of a terminal device such as a mobile phone, a tablet or a personal computer, the user can more intuitively and clearly understand the following schedule through the audio, photos or video.

5. The electronic dynamic calendar of the present disclosure can share at least an object containing audio, photos or video or at least a group having the object to other users, which not only serves as a reminder, but also facilitates interaction or connection between the users.

The above-described descriptions of the detailed embodiments are to illustrate the implementation according to the present disclosure, and it is not to limit the scope of the present disclosure. Accordingly, all modifications and variations completed by those with ordinary skill in the art should fall within the scope of present disclosure defined by the appended claims

What is claimed is:

1. An electronic dynamic calendar system, comprising:
   a display having a screen;
   a data transmission interface for receiving a multimedia message; and
   a processing unit, comprising:
   a calendar database for providing an electronic calendar having a plurality of fields, wherein each of the fields is used for accessing record information;
   a classification module for classifying the multimedia message received by the data transmission interface into the record information, wherein the record information is at least one object or at least one group, and wherein the at least one object is the multimedia message and the at least one group has the at least one object;
   a storage module for storing the record information generated by the classification module into any one of the fields of the electronic calendar;
   a dynamic state setting module for setting a dynamic state of the field of the electronic calendar having the record information stored therein so as to cause the electronic calendar to become an electronic dynamic calendar, wherein the dynamic state of the field is a thumbnail or text;
   a display module for outputting the electronic dynamic calendar to the screen of the display, thereby displaying the dynamic state of the field of the electronic dynamic calendar on the screen of the display;
   a search module for searching for the record information in any one of the fields of the electronic dynamic calendar or the dynamic state of the field by using a keyword, time, date, file format, position or a combination thereof;
   a reminder module for setting the dynamic state of any one of the fields of the electronic dynamic calendar as a reminder according to time, date or a combination thereof; and
   a multimedia module for obtaining the multimedia message through an audio recording device or a photo or video capturing device of a terminal device so as for the classification module to classify the multimedia message obtained by the multimedia module into the record information.

2. The electronic dynamic calendar system of claim 1, wherein the electronic dynamic calendar opens access to edit the at least one object or the at least one group, or the classification module further classifies the multimedia message into the record information according to time, date, file format, position or a combination thereof, and wherein the position is an address or is latitude and longitude.

3. The electronic dynamic calendar system of claim 1, wherein the classification module further classifies a web address into the record information, and the record information is the at least one object or the at least one group, and wherein the at least one object is the multimedia message or the web address, and the at least one group has the at least one object.

4. The electronic dynamic calendar system of claim 1, wherein according to time, date or a combination of time and date of the record information, the storage module stores the record information in a field of the electronic calendar having the same time, date or a combination thereof.

5. The electronic dynamic calendar system of claim 1, wherein the display module further allows to move the dynamic state of the field of the electronic dynamic calendar displayed on the screen of the display to any one of the fields of the electronic dynamic calendar displayed on the screen.

6. The electronic dynamic calendar system of claim 1, wherein after the dynamic state of the field on the screen of the display is clicked, the display module displays complete content of the record information corresponding to the clicked dynamic state of the field on the screen of the display.

7. The electronic dynamic calendar system of claim 1, further comprising a login module for creating an electronic dynamic calendar account, logging in to the electronic dynamic calendar system with an existing electronic dynamic calendar account or logging in to the electronic dynamic calendar system with a social account.

8. The electronic dynamic calendar system of claim 7, wherein after the login module logins to the electronic dynamic calendar system with the social account, the login module synchronizes the social account, such that the multimedia message of the social account is transmitted through the data transmission interface to the classification module for classification and stored by the storage module in any one of the fields of the electronic calendar of the calendar database.

9. A method of electronic dynamic calendar operation, comprising:
   providing, by a calendar database, an electronic calendar having a plurality of fields, wherein each of the fields is used for accessing record information;
   classifying, by a classification module, a multimedia message received by a data transmission interface into the record information, wherein the record information is at least one object or at least one group, and wherein the at least one object is the multimedia message and the at least one group has the at least one object;
   storing, by a storage module, the record information generated by the classification module into any one of the fields of the electronic calendar;
   setting, by a dynamic state setting module, a dynamic state of the field of the electronic calendar having the record information stored therein so as to cause the electronic calendar to become an electronic dynamic calendar, wherein the dynamic state of the field is a thumbnail or text;
   outputting, by a display module, the electronic dynamic calendar to a screen of a display, thereby displaying the dynamic state of the field of the electronic dynamic calendar on the screen of the display;
   searching for the record information by a search module in any one of the fields of the electronic dynamic calendar or the dynamic state of the field by using a keyword, time, date, file format, position or a combination thereof;
   setting, by a reminder module, the dynamic state of any one of the fields of the electronic dynamic calendar as a reminder according to time, date or a combination thereof; and
   obtaining, by a multimedia module, the multimedia message through audio recording or photo or video capturing.

10. The method of claim 9, further comprising opening, by the electronic dynamic calendar, access to edit the at least one object or the at least one group.

11. The method of claim 9, further comprising classifying, the classification module, the multimedia message into the record information according to time, date, file format, position or a combination thereof, wherein the position is an address or is latitude and longitude.

12. The method of claim 9, further comprising classifying, by the classification module, a web address into the record information, wherein the record information is the at least one object or the at least one group, and wherein the at least one object is the multimedia message or the web address, and the at least one group has the at least one object.

13. The method of claim 9, further comprising, according to time, date or a combination of time and date of the record information, storing, by the storage module, the record information in a field of the electronic calendar having the same time, date or a combination thereof.

14. The method of claim 9, further comprising allowing, by the display module, to move the dynamic state of the field of the electronic dynamic calendar displayed on the screen of the display to any one of the fields of the electronic dynamic calendar displayed on the screen.

15. The method of claim 9, further comprising, after the dynamic state of the field on the screen of the display is clicked, displaying complete content of the record information corresponding to the clicked dynamic state of the field on the screen of the display.

16. The method of claim 9, further comprising creating, by a login module, an electronic dynamic calendar account, and logging in to the electronic dynamic calendar system with an existing electronic dynamic calendar account or logging in to the electronic dynamic calendar system with a social account.

17. The method of claim 16, further comprising, after the login module logins to the electronic dynamic calendar system with the social account, synchronizing, by the login module, the social account such that the multimedia message of the social account is transmitted through the data transmission interface to the classification module for classification and stored by the storage module in any one of the fields of the electronic calendar of the calendar database.

18. A non-transitory computer readable storage medium applicable in a computer, which stores instructions for performing the method of claim 9.

* * * * *